(12) United States Patent
Kwon

(10) Patent No.: US 7,038,738 B2
(45) Date of Patent: May 2, 2006

(54) REMOTE-CONTROLLABLE MEDIA DEVICE AND METHOD OF OPERATING PERIPHERAL DEVICES USING THE SAME

(75) Inventor: Il Gun Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 739 days.

(21) Appl. No.: 09/942,710

(22) Filed: Aug. 31, 2001

(65) Prior Publication Data

US 2002/0024617 A1    Feb. 28, 2002

(30) Foreign Application Priority Data

Aug. 31, 2000 (KR) .............................. 2000-51239

(51) Int. Cl.
*H04N 5/44* (2006.01)

(52) U.S. Cl. ...................... 348/734; 348/552; 348/553

(58) Field of Classification Search ................ 348/734, 348/552, 553, 554; 340/825.69, 825.72, 340/7.39; H04N 5/44
See application file for complete search history.

(56) References Cited

U.S. PATENT DOCUMENTS

| | | | | |
|---|---|---|---|---|
| 6,469,633 B1 * | 10/2002 | Wachter | ................. | 340/825.69 |
| 6,469,751 B1 * | 10/2002 | Isobe et al. | .................. | 348/734 |
| 6,526,579 B1 * | 2/2003 | Sato | ............................ | 725/58 |
| 6,549,719 B1 * | 4/2003 | Mankovitz | ................... | 386/83 |
| 6,567,011 B1 * | 5/2003 | Young et al. | .......... | 340/825.69 |

* cited by examiner

*Primary Examiner*—John Miller
*Assistant Examiner*—Trang U. Tran
(74) *Attorney, Agent, or Firm*—Birch, Stewart, Kolasch & Birch, LLP

(57) ABSTRACT

Disclosed is a remote-controllable media device and method of operating peripheral devices using the same including the steps of monitoring whether a remote code is received from a remote controller, verifying that a present external input source mode corresponds to which one of the peripheral media devices when the remote code is received from the remote controller, and converting the received code into a code corresponding to the present external input source mode when the peripheral media device corresponding to the present external input source mode is connected to the media device and then transferring the converted code to the peripheral media device corresponding to the present external input source mode.

57 Claims, 4 Drawing Sheets

REMOTE-CONTROLLABLE MEDIA DEVICE AND METHOD OF OPERATING PERIPHERAL DEVICES USING THE SAME

BACKGROUND OF THE INVENTION

1. Field of the Invention

The present invention relates to a remote-controllable media device and a method of operating peripheral devices using the same.

2. Background of the Related Art

Generally, media devices are means dealing with video signals such as TV set, video cassette recorder (VCR), set-top box, DVD, compact disc (CD) player and the like. Such devices have their own remote controllers respectively and basically are operated remotely with the use of characteristic remote controllers.

As known widely, many media devices have been developed so far and are used together by being connected to each other. The media devices connected to each other transmits/receives their characteristic data by a user's manipulation. For transmitting/receiving data reciprocally, a user is inconvenienced by using a plurality of remote controllers.

For instance, when a cable set-top box is connected to a TV receiver, a user has to use a remote controller for the cable set top box operating functions of the cable set-top box, while using another remote controller for the TV receiver for operating functions of the TV receiver. Moreover, the user has to use the remote controller of the TV receiver for adjusting a volume of the TV receiver, while pushing channel buttons on the cable set-top box remote controller to change channels of the cable set-top box. Thus, the user is inconvenienced to manipulate both of the remote controllers for the TV receiver and cable set-top box.

Meanwhile, the set-top box serves various functions such as TV information guide and the like, it is expected that the remote controller is likely to be manipulated more frequently. Thus, the manipulation of various remote controllers will be more inconvenient with the expectation of frequent use of the remote controllers to operate various functions of the TV receiver and peripheral devices thereof.

In order to connect the cable set-top box to the TV receiver, there are two ways for such a connection. First, an RF output port of the cable set-top box is connected to an RF input port of the TV receiver while a receiver channel of the TV receiver is set as channel 3 or channel 4, whereby a viewer can watch a cable-broadcasted program through the TV receiver. Second, an output terminal for composite signal of the cable set-top box is connected to an input terminal for an external composite signal of the TV receiver.

While the above connection is maintained, a remote controller for the cable set-top box is necessary for changing a receiver channel of the cable set-top box. Besides, a remote controller for the TV receiver is necessary as well for adjusting a volume of the TV receiver. Moreover, the characteristic remote controllers should be used for turning on/off the corresponding powers of the TV receiver and the cable set-top box, respectively. Further, the characteristic remote controllers are respectively used for manipulating menus of the TV receiver and cable set-top box as well.

As mentioned in the above explanation, in order to reduce the inconvenience of using the various characteristic remote controllers, a unified remote controller in which remote controller codes of a plurality of media devices are built in has been proposed. Yet, the unified remote controller should be programmed precisely to fit the corresponding media devices so as to be used properly. The programming is actually too complicated to be carried out precisely by a user. Besides, the unified remote controller is unable to be used for manipulating the media device provided that the remote controller code of the corresponding media device has not been programmed therein.

SUMMARY OF THE INVENTION

Accordingly, the present invention is directed to a remote-controllable media device and a method of operating peripheral devices using the same that substantially obviates one or more problems due to limitations and disadvantages of the related art.

An object of the present invention is to provide a remote-controllable media device and a method of operating peripheral devices using the same enabling easy operation of peripheral media devices connected to a media device using a remote controller of the media device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of operating peripheral media devices using a media device having a remote controller according to the present invention includes the steps of monitoring whether a remote code is received from a remote controller, verifying that a present external input source mode corresponds to which one of the peripheral media devices when the remote code is received from the remote controller, and converting the received code into a code corresponding to the present external input source mode when the peripheral media device corresponding to the present external input source mode is connected to the media device and then transferring the converted code to the peripheral media device corresponding to the present external input source mode.

Preferably, the method further includes the step of displaying on a screen whether the media device and the peripheral media device corresponding to the present external input source mode are connected to each other.

Preferably, the method further includes the step of displaying character and video signals from the peripheral media device corresponding to the present external input source mode on a screen of the media device in accordance with the remote code.

Preferably, the method further includes the steps of processing the code to operate the media device itself when the peripheral media device corresponding to the present external input source mode fails to be connected to the media device or the present external input source mode corresponds to the media device itself, and operating the media device in accordance with a command corresponding to the processed code.

More preferably, information of the code processed by the media device itself includes volume adjustment of the media device and change of the present external input source mode.

Preferably, the media device and peripheral media devices include TV receiver, DVD, video cassette recorder, and set-top box.

Preferably, the method further includes the steps of executing a command corresponding to the converted code in the peripheral media device corresponding to the present external input source mode, transferring an execution result from the peripheral media device corresponding to the present external input source mode to the media device, and displaying an image according to the execution result on a screen and outputting a voice according to the execution result through a speaker of the media device.

Preferably, the method further includes the step of providing a communication channel set-on or set-off signal from the remote controller to the media device by a user's selection so as to turning on or off a mode for establishing communication channels between the media device and the peripheral media devices.

More preferably, the communication channel set-on signal is provided when the peripheral media devices have the same communication ports of the media device on an on-screen display menu of the media device from the remote controller by a user and wherein the communication channel set-off signal is provided when the peripheral media devices fail to have the same communication ports of the media device on an on-screen display menu of the media device from the remote controller by a user.

More preferably, the communication port is one of RS232C, I2C, and parallel port.

Preferably, the method further includes the steps of monitoring whether a code to change the present external input source mode into a new external input source mode is produced from the remote controller, and relieving the established communication channel between the present external input source and the media device and establishing a new communication channel between the new external input source and the media device.

In another aspect of the present invention, a media device according to the present invention includes a remote controller producing a remote code for controlling for its own use, a remote code for controlling peripheral media devices, and selection signals of external input sources in accordance with a user's selection, a communication port to be connected with the peripheral media devices through an exclusive communication line, a receiver part receiving one of the remote codes from the remote controller, a controller verifying that a present external input source corresponds to which one of the peripheral media devices and produces a code conversion control signal and an output control signal, a memory storing code conversion data, and a code converter converting the code into a code corresponding to the verified peripheral media device using the code conversion data stored in the memory by responding to the code conversion control signal, the code converter outputting the converted code to the verified peripheral media device through the communication port by responding to the output control signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
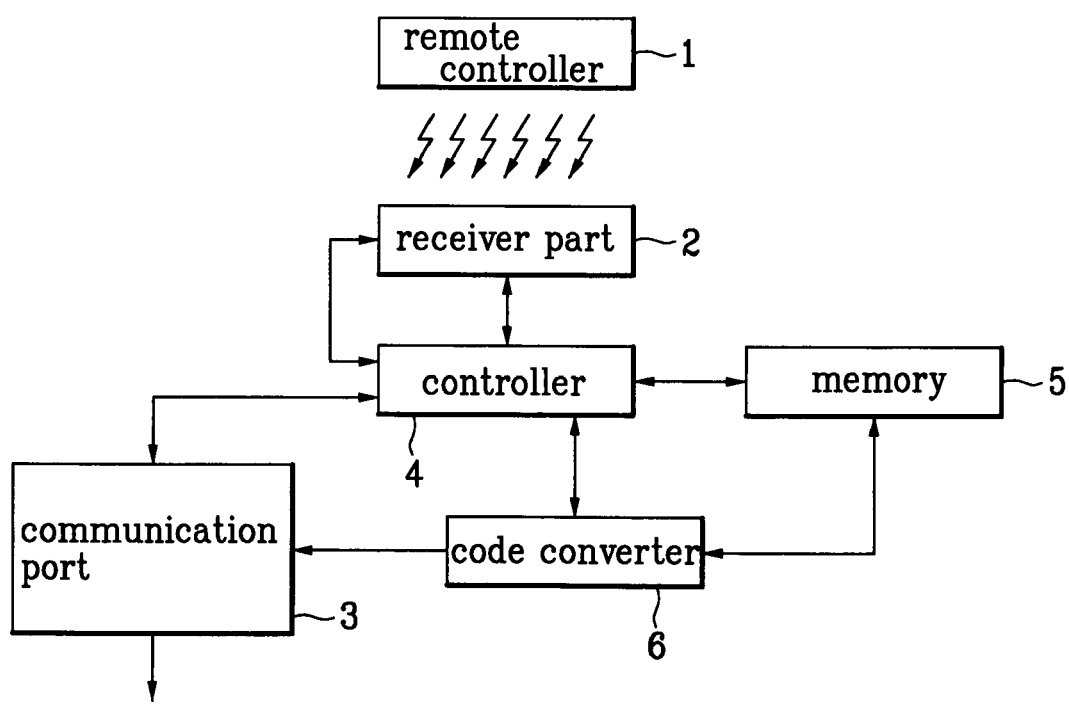
FIG. 1 illustrates a block diagram of a media device according to the present invention.

FIG. 1 illustrates a block diagram of a media device according to the present invention.

Referring to FIG. 1, a media device according to the present invention includes a remote controller 1, a receiver part 2, a communication port 3, a controller 4, a memory, and a code converter 6.

The remote controller produces a remote code for controlling the media device itself and other remote codes for other peripheral media devices in accordance with a user's choice. The receiver part 2 receives the remote code from the remote controller 1 and processes the received code into a form enabling recognition by the controller 4. The communication port 3 is established so as to form communication channels with other communication ports of the peripheral media devices. The controller 4, when receiving the remote code, verifies which media device among the peripheral media devices corresponds to a present input source mode and then produces a code conversion control signal in accordance with a result of the verification. Besides, the controller 4 verifies that the peripheral media device corresponding to the present external input mode is connected to the communication port 3, converts the code into a form fit for the verified peripheral media device if the peripheral media device corresponding to the present external input mode is connected to the communication port 3, and then produces an output control signal for outputting the converted code to the verified peripheral media device. The memory 5 stores code conversion data and outputs the stored code conversion data in accordance with a control of the controller 4. The code converter 6 responds to the code conversion control signal from the controller 4 and converts the remote code into a code for the verified peripheral media device using the code conversion data. The code convert 6 responds to the output control signal and outputs the converted code to the verified peripheral media device through the communication port 3.

The media device in FIG. 1 enables operation of peripheral media devices having the same communication ports through the remote controller 1. The media device in FIG. 1 is one of a television (TV) receiver, a videocassette recorder, a DVD player, a set-top box and the like.

Operation of the media device in FIG. 1 is explained as follows. Referring to FIG. 1, the media device requires a communication port 3 such as an RS-232 serial port. And, the peripheral media devices require the same communication ports so as to be connected to the communication port 3. Besides, the communication port 3 may be one of an I²C bus port and a parallel port. Once the remote controller 1 for the media device produces a remote code by a user's selection, the receiver part 2 receives the remote code and then processes the received remote code into a signal having a form enabling recognition by the controller 4. The receiver part 2 then transfers the processed code to the controller 4. The controller 4 judges the processed code in accordance with a preset condition. If the processed code is for executing a built-in function of the media device itself, the controller 4 uses the processed code of the remote controller 1 for operating the media device. On the other hand, if the processed code is for operating one of peripheral media devices such as a set-top box and a video cassette recorder (VCR), the code from the remote controller 1 is converted by the code converter 6 into a code for the peripheral media device connected to the media device. Such a converted code responds to the output control signal from the controller 4 so as to be transferred to the corresponding peripheral media device through the communication port 3.

As mentioned in the above description, the media device according to the present invention enables direct operation of the peripheral media devices connected to the media device itself using the media device remote controller. For instance, if the media device is a TV receiver, peripheral media devices connected to the TV receiver such as VCR, DVD and set-top box are operated using a remote controller of the TV receiver, obviating the need to operate remote controllers for the peripheral media devices additionally.

Meanwhile, the TV receiver provides various input ports enabling respective connections to a VCR, DVD player, cable set-top box, satellite set-top box, and PC. In order to realize a method according to the present invention, keys for designating external input sources selectively may be provided on a TV receiver remote controller. When a user designates one of the peripheral media devices connected to the TV receiver using the remote controller, the TV receiver transfers a code outputted from the remote controller to the corresponding media device through a communication port of the corresponding media connected to the communication port of the TV receiver itself. The peripheral media device having received the code from the remote controller then executes functions corresponding to the code. Meanwhile, when the user directs input source of the TV receiver of the main media device from another peripheral media device, the main media device converts the code into another code corresponding to the peripheral media device and then transfers the converted code to the corresponding media device through the communication port.

Figure 2:
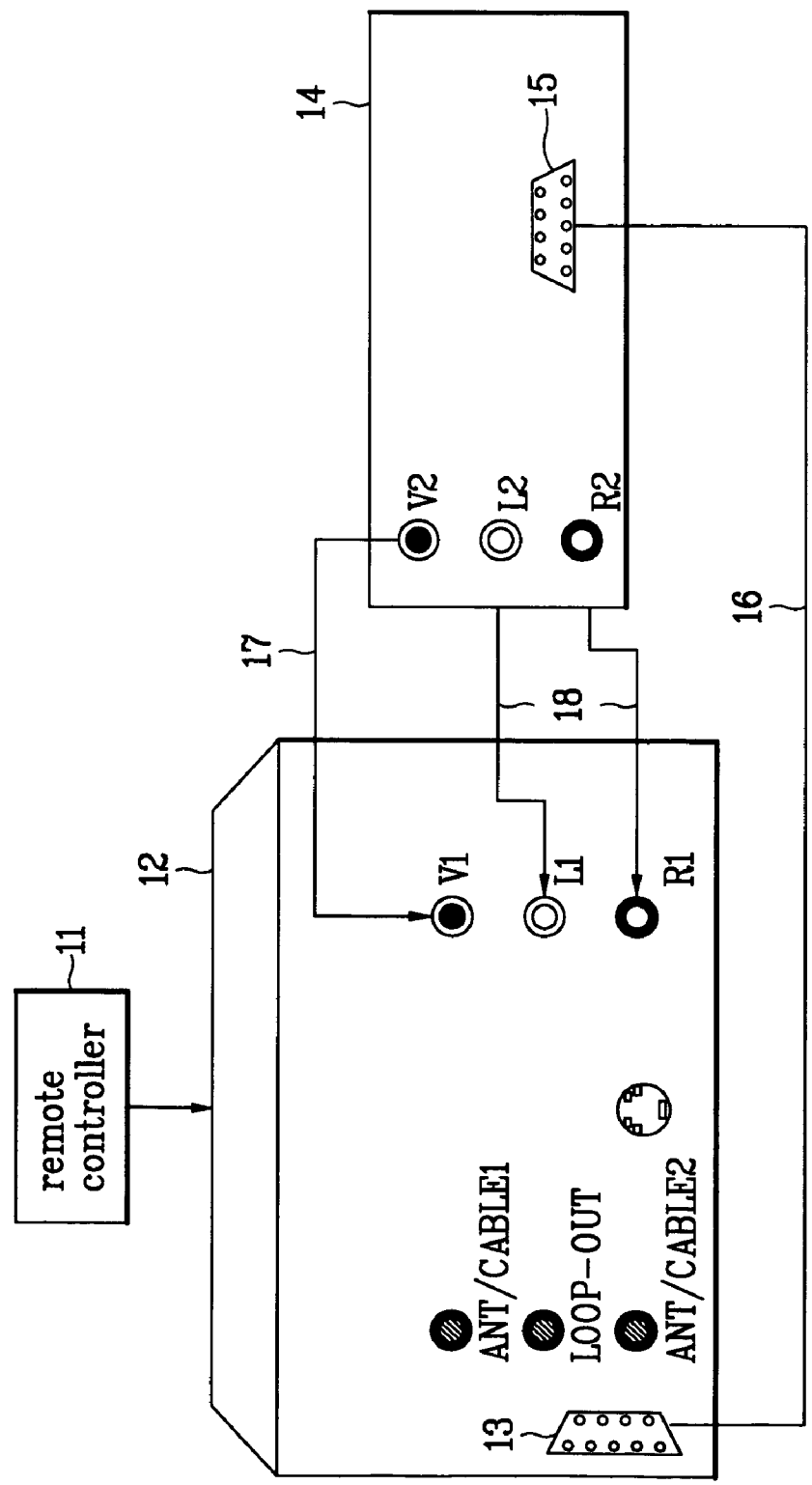
FIG. 2 illustrates a diagram for wired connection between a TV receiver and a cable set-top box according to the present invention.

FIG. 2 illustrates a diagram for wired connection between a TV receiver (the main media device) and a cable set-top box according to the present invention.

Referring to FIG. 2, reference numerals/signs '11', '12', '13', 'ANT/CABLE1 and ANT/CABLE2', 'LOOP-OUT', 'V1', 'L1 and R1', '14', '15', '16', '17', '18', 'V2', and 'L2 and R2' are a TV receiver remote controller, a TV receiver, a communication port of the TV receiver, terminals of the TV receiver to be connected to an antenna and a cable broadcasting, a loop-out terminal of the TV receiver, a video terminal of the TV receiver, audio terminals of the TV receiver, a set-top box, a communication port of the set-top box, an exclusive (dedicated) communication line, a video/audio line, voice lines, a video terminal of the set-top box, and audio terminals of the set-top box. The TV receiver 12 shown in FIG. 12 has the communication port 13 at its back terminal panel, and the set-top box 14 has a communication port at its back panel as well so as to receive a code outputted from the remote controller 11 of the TV receiver 12. The TV receiver 12 and set-top box 14, as shown in FIG. 1, are connected through a wire. The TV receiver 12 and set-top box 14 may be connected to each other using a wireless connection such as transmission/receiving of IR (infrared) signals. When a pair of media devices are connected to each other using such a wireless connection, the reciprocal connection free from the exclusive communication line (RS232) connecting theses media devices is much facilitated.

While maintaining the above connection, the remote controller 11 of the TV receiver 12 produces a remote code directed to the TV receiver 12 by a user's selection. In this case, the TV receiver 12 receives the remote code and then detects a present input source mode. If the present input source mode is a mode of the TV receiver's own, the inputted code corresponds to functions of the TV receiver 12. Therefore, the TV receiver 12 processes the code in itself and then carries out the function corresponding to the processed code.

If the input source mode corresponds to the set-top box 14, the code is transformed into a code corresponding to the set-top box 14 inside the TV receiver 12. The transformed code is then transmitted to the communication port 15 of the set-top box 14 through the exclusive communication line 16.

Subsequently, the set-top box 14 executes a command corresponding to the transmitted code through the exclusive communication line 16 and then transfers the execution result to the TV receiver through the video and audio lines 17 and 18. Thereafter, the TV receiver 12 displays an image according to the execution result on a screen as well as outputs the execution result through a speaker. Thus, the user can confirm whether the command corresponding to the code is executed through the displayed image or the variation of the output audio. Once the command is executed, an on-screen display (OSD) menu of the set-top box 14 is displayed on the screen of the TV receiver 12 through the video and audio lines 17 and 18. As mentioned in the foregoing description, codes from the TV receiver remote controller 11 are transferred to the set-top box 14 through the exclusive communication line 16 by manipulating the remote controller 11 consecutively, the set-top box 14 executes the commands according to the codes, and the results are displayed on the screen of the TV receiver 12. Therefore, execution results according to the codes are fed back to the user.

If the input source mode is changed into the TV receiver, the code from the TV receiver remote controller 11 needs not be transferred to the set-top box 14. Hence, a communication channel between the TV receiver 12 and set-top box 14 is naturally shut off while the code from the remote controller 11 is processed and used in the TV receiver 12.

Besides, as an additional step, if the input source mode is changed from the TV receiver into the set-top box, the TV receiver 12 confirms whether the connection between the TV receiver 12 and set-top box 14 is completed. If the connection fails, the TV receiver 12 displays a message that there is no communication channel with the set-top box 14 on its screen. Hence, a user can verify the connection between the TV receiver 12 and set-top box 14. On the contrary, if it is detected that a communication channel between the TV receiver 12 and set-top box 14 is established while the input source mode is changed from the TV receiver 12 into the set-top box 14, the TV receiver 12 displays a message that such a communication channel is established on the screen. Thus, the user can continuously produce another code corresponding to a user-demanding command to the set-top box 14 using the remote controller 11 of the TV receiver 12.

Generally on the menu of the TV receiver 12, there is an item turning on/off communication channel establishments with other peripheral media devices. For instance, when a user purchases a peripheral media device without a communication port compatible with that of the TV receiver, the item for the communication channel establishment is turned off. In this case, the TV receiver is connected to the purchased media device using a conventional method.

On the other hand, when the user owns a TV receiver and peripheral media devices backed up with a communication channel establishment item and intends to use a method according to the present invention, the communication channel establishment item is just turned on by the user. If this item is turned on, the TV receiver automatically verifies whether a communication channel is established between the TV receiver itself and the peripheral media device when the input source mode is changed into one of the peripheral media devices by a user's selection from the TV receiver. If the reciprocal connection is completed, a message that the reciprocal connection is completed is displayed on a screen. Otherwise, a message that the reciprocal connection fails is displayed on the screen. Moreover, when the user wants no communication channel establishment, the communication channel establishment item may be removed from the menu of the TV receiver. Otherwise, the communication channel establishment item appears on the menu of the TV receiver.

Figure 3:
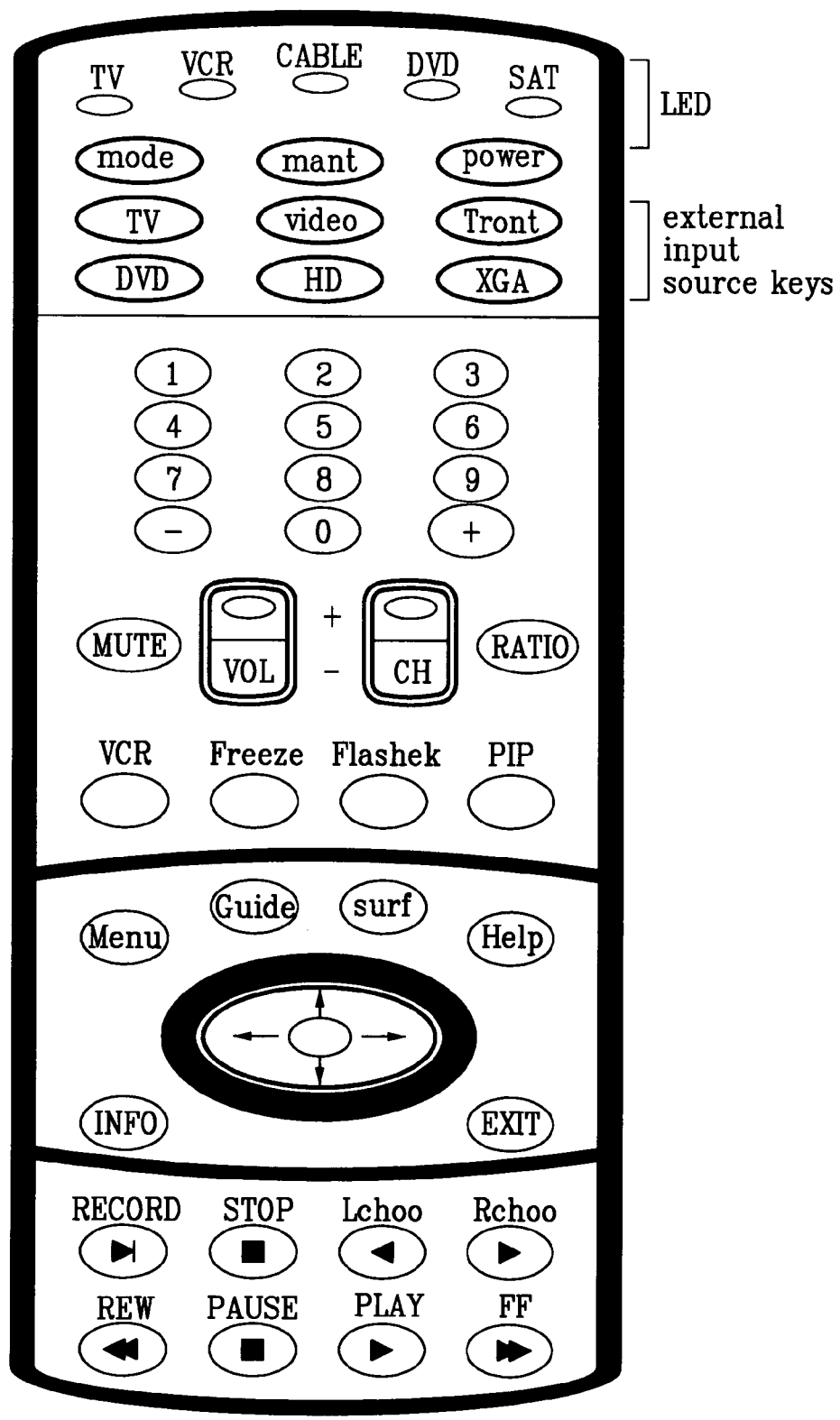
FIG. 3 illustrates keys arranged on a remote controller for a TV receiver which are required for realizing a media device and a method thereof according to the present invention.

FIG. 3 illustrates keys arranged on a remote controller for a TV receiver which are required for realizing a media device and a method thereof according to the present invention.

Figure 4:
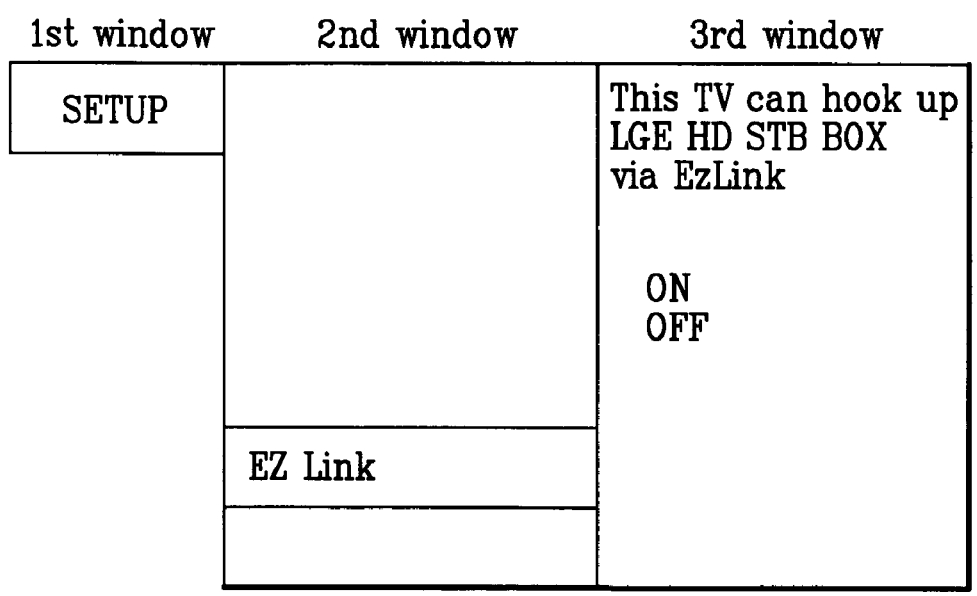
FIG. 4 illustrates a diagram of a message displayed on a screen of a TV receiver for a channel establishment between the TV receiver and a set-top box.

FIG. 4 illustrates a diagram of a message displayed on a screen of a TV receiver for a channel establishment between the TV receiver and a set-top box.

Referring to FIG. 3, the arrangement of keys is closely related to establishment of communication channels between the TV receiver and peripheral media devices. The keys for the communication channel establishment and other keys for selecting external input sources are arranged on an upper part of the remote controller, thereby enabling a selection or change of the external input sources and a verification of whether the communication channel is established when an arbitrary input source change is made.

The remote controller shown in FIG. 3 is a universal type remote controller programmed to produce codes for operating peripheral media devices such as VCR, cable set-top box, DVD and the like connected to a TV receiver. By programming the remote controller using a given method, codes for the peripheral media devices to be connected to the TV receiver are produced. For instance, while the remote controller is precisely programmed, a MODE key in FIG. 3 is pressed so as to produce a remote code for the peripheral media device. Moreover, when the MODE key is pressed, light emitting diodes (LEDs) placed at the top upper part of the remote controller emit lights successively according to the names of the peripheral media devices. The MODE key is provided for controlling a desired peripheral media device when its corresponding communication channel is not yet established between the TV receiver and the peripheral media devices. When communication channels are established between the TV receiver and peripheral media devices, the MODE key is used for setting the input source as the TV receiver.

The external input source keys shown in FIG. 3 are used for setting the peripheral media devices as external input sources while the peripheral media devices are connected to the TV receiver. Namely, each of these keys designates the corresponding peripheral media device as an external input source in view of the TV receiver. If the external input source keys are pressed, the TV receiver internally changes paths of input source signals applied from an external input source. The TV receiver then automatically detects whether a communication channel is established to transfer a code of the remote controller for the selected external input source.

For instance, when a communication channel between the DVD and TV receiver fails to be established, a message that the communication channel is not connected is displayed on a screen of the TV receiver and key codes received thereafter from the remote controller are immediately transferred inside the TV receiver. In this case, a command corresponding to the received code is executed inside the TV receiver and then the execution result is displayed on the screen of the TV receiver. First of all, if a MENU key is pressed while the communication channel fails to be established between two media devices, an OSD menu of the TV receiver's own is displayed on the screen of the TV receiver. Subsequently, if a DVD key is pressed while the communication channel is established between the TV receiver and DVD, the TV receiver directs paths of video and voice signals to the DVD and confirms that the communication channel is established. A message that the communication channel is established is then displayed on the screen. Thereafter, the key codes from the remote controller are changed into code values of the DVD by the remote controller itself and then sent to the DVD through an exclusive communication line. In this case, the TV receiver plays the simple role of transferring the received key codes to the DVD.

When the communication channel is established, if the DVD key as an input source and the MENU key are pressed in order, a menu of the DVD is displayed on a screen of the TV receiver. The menu-related key codes produced thereafter are transferred to the DVD through the communication channel.

When the communication channels are pre-established between the TV receiver and the peripheral media devices, the key codes of the remote controller require a predetermined system so as to be transferred to the peripheral media devices. For instance, the key codes of the remote controller are processed differently in accordance with the external input sources. Especially, regarding a volume adjustment of the TV receiver, a key code for mute and volume of the TV receiver is processed inside the TV receiver. Namely, when the volume key code is received from the remote controller, the volume key code is directly processed inside the TV receiver regardless of the external input source and fails to be transferred to the selected external input source through the pre-established communication channel. Instead, the code may be transferred to the connected external input source in accordance with the constructional characteristics of the TV receiver.

Moreover, the TV receiver may process the codes from the external input source keys without their transfer to the peripheral media devices connected to the TV receiver. As the external input source keys are keys for use by the TV receiver alone, it is unnecessary to transfer the codes to the peripheral media devices connected to the TV receiver. Receiving a code by a specific external input source key, the TV receiver changes internally the input signal path from the selected external input source. The remaining key codes for channel selection, menu-relating matter and the like are transferred to the selected external input source directly when the communication channel is pre-established between the selected external input source and TV receiver.

As mentioned in the above description of the media device and method thereof according to the present invention, one media device including a communication port and a code converter verifies the channel establishment with the other peripheral media device, thereby enabling to operate the other media device using a remote controller of its own. Accordingly, the present invention provides a user with a convenience for operating various media devices using a single remote controller.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A media device comprising:
   a remote controller producing a remote code for controlling for its own use, a remote code for controlling peripheral media devices, and selection signals of external input sources in accordance with a user's selection;
   a communication port to be connected with the peripheral media devices through a communication line;
   a receiver part receiving one of the remote codes from the remote controller;
   a media device controller that verifies that a present external input source corresponds to one of the peripheral media devices and that produces a code conversion control signal in a form fit for the verified peripheral media device if the peripheral media device corresponding to the present external input mode is connected to the communication port and an output control signal for outputting the converted code to the verified peripheral media device;
   a media device memory storing code conversion data; and
   a media device code converter converting a remote code into a code corresponding to the verified peripheral media device using the code conversion data stored in the memory by responding to the code conversion control signal, the code converter outputting the converted code to the verified peripheral media device through the communication port by responding to the output control signal to operate the verifier peripheral media device in accordance with a command corresponding to the converted code.

2. The media device of claim 1, wherein the media device and peripheral media devices include a TV receiver, a DVD, a videocassette recorder, and a set-top box.

3. The media device of claim 1, wherein the communication port is one of an RS232C, an I2C, and a parallel port.

4. The media device of claim 1, wherein the media device further comprises a display part displaying a menu of the media device, a menu of the verified peripheral media device, and an operation status of the controller by responding to the code of the remote controller.

5. The media device of claim 1, wherein the remote controller includes keys for selecting the external input sources corresponding to the peripheral media devices enabling the peripheral media devices to be connected to the media device.

6. The media device of claim 1, wherein the peripheral media devices includes communication ports identical to the communication port so as to establish communication channels with the media device.

7. A method of operating peripheral media devices using a media device having a remote controller, comprising the steps of:
   monitoring by the media device whether a remote code is received from a remote controller;
   verifying by the media device that a present external input source mode corresponds to which one of the peripheral media devices when the remote code is received from the remote controller; and
   converting by the media device the received code into a code corresponding to the present external input source mode in a form fit for the verified peripheral media device when the peripheral media device corresponding to the present external input source mode is connected to the media device and then transferring the converted code to the peripheral media device corresponding to the present external input source mode.

8. The method of claim 7, further comprising the step of displaying on a screen whether the media device and the peripheral media device corresponding to the present external input source mode are connected to each other.

9. The method of claim 7, further comprising the step of displaying character and video signals from the peripheral media device corresponding to the present external input source mode on a screen of the media device in accordance with the remote code.

10. The method of claim 7, further comprising the steps of: processing the code to operate the media device itself when the peripheral media device corresponding to the present external input source mode fails to be connected to the media device or the present external input source mode corresponds to the media device itself; and operating the media device in accordance with a command corresponding to the processed code.

11. The method of claim 10, wherein information of the code processed by the media device itself includes volume adjustment of the media device and change of the present external input source mode.

12. The method of claim 7, wherein the media device and peripheral media devices include a TV receiver, a DVD, a videocassette recorder, and a set-top box.

13. The method of claim 7, further comprising the steps of:
   executing a command corresponding to the converted code in the peripheral media device corresponding to the present external input source mode;
   transferring an execution result from the peripheral media device corresponding to the present external input source mode to the media device; and
   displaying an image according to the execution result on a screen and outputting a voice according to the execution result through a speaker of the media device.

14. The method of claim 7, further comprising the step of providing a communication channel set-on or set-off signal from the remote controller to the media device by a user's selection so as to turn on or off a mode for establishing communication channels between the media device and the peripheral media devices.

15. The method of claim 14, wherein the communication channel set-on signal is provided when the peripheral media devices have the same communication ports of the media device on an on-screen display menu of the media device from the remote controller by a user and wherein the communication channel set-off signal is provided when the peripheral media devices fail to have the same communication ports of the media device on an on-screen display menu of the media device from the remote controller by a user.

16. The method of claim 15, wherein the communication port is one of an RS232C, an I2C, and a parallel port.

17. The method of claim 7, further comprising the steps of: monitoring whether a code to change the present external input source mode into a new external input source mode is produced from the remote controller; and relieving the established communication channel between the present external input source and the media device and establishing a new communication channel between the new external input source and the media device.

18. A method of controlling a multimedia system, using a main media device having at least one communication port connected via an exclusive communication line to at least one peripheral media device providing an input source to the main media device, the method comprising:
  storing, in the main media device, code conversion data corresponding to the main media device and the at least one peripheral media device;
  inputting a control code to the main media device, the control code indicative of an input source mode corresponding to one of the at least one peripheral media device;
  verifying, using the main media device in response to the input control code, an establishment of a communication channel via the exclusive communication line, the communication channel corresponding to the one of the at least one peripheral media device;
  converting using the main media device the input control code into a converted control code for controlling the one of the at least one peripheral media device; and
  outputting, from the main media device via the established communication channel, the converted control code in form fit for the verified peripheral media device if the peripheral media device corresponding to the present external input mode is connected to the communication port to the one of the at least one peripheral media device,
  wherein the input control code is converted and output when the establishment of a communication channel corresponding to the one of the at least one peripheral media device is verified via the exclusive communication line and wherein the input control code is otherwise processed in the main media device.

19. The method of claim 18, wherein the control code is input to the main media device via a remote controller.

20. The method of claim 18, wherein the exclusive communication line is connected to the at least one peripheral media device at a communication port compatible with the at least one communication port of the main media device.

21. The method of claim 20, wherein the at least one communication port of the main media device is one of an RS-232 serial port, an I²C bus port, and a parallel port.

22. The method of claim 18, further comprising:
  displaying an indication of the establishment of a communication channel corresponding to the one of the at least one peripheral media device.

23. The method of claim 22, wherein the communication channel establishment indication is displayed by the main media device.

24. The method of claim 23, wherein the communication channel establishment indication is displayed using an on-screen display of the main media device.

25. The method of claim 18, further comprising:
  displaying an indication of the input source mode according to the input control code.

26. The method of claim 25, wherein the input source mode indication is displayed by the main media device.

27. The method of claim 26, wherein the input source mode indication is displayed using an on-screen display of the main media device.

28. The method of claim 18, wherein the input source to the main media device generates at least one of an audio signal and a video signal and wherein the at least one of an audio signal and a video signal is output by the main media device according to the input control code.

29. The method of claim 18, further comprising:
  processing, when there is no establishment of a communication channel corresponding to the one of the at least one peripheral media device, the input control code to control the main media device according to the processed control code.

30. The method of claim 29, wherein the processed control code indicates that the input source mode corresponds to the main media device.

31. The method of claim 29, wherein the processed control code indicates one of a volume control and a change of the input source mode.

32. The method of claim 18, wherein the main media device includes a television receiver.

33. The method of claim 18, wherein the at least one peripheral media device includes at least one of a television receiver, a DVD player, a videocassette recorder, and a set-top box.

34. The method of claim 18, further comprising:
  processing, in the one of at least one peripheral media device, the converted control code output via the established communication channel;
  controlling the one of at least one peripheral media device according to the processed control code; and
  outputting, from the one of at least one peripheral media device, the input source to the main media device, the input source being controlled according to said controlling step.

35. The method of claim 34, further comprising:
  generating on-screen data for inclusion with the controlled input source.

36. The method of claim 35, wherein the on-screen data is generated by the one of at least one peripheral media device according to the processed control code.

37. The method of claim 18, wherein the input control code includes a communication channel on-off signal for controlling the establishment of a communication channel for each of the at least one peripheral media device.

38. The method of claim 37, further comprising:
  setting the established communication channel based on the communication channel on-off signal of the input control code, the set communication channel carrying the converted control code to the one of the at least one peripheral media device.

39. The method of claim 38, wherein the input source mode is determined by the set communication channel.

40. The method of claim 38, wherein the communication channel on-off signal includes a communication channel on signal and a communication channel off signal, the communication channel on signal corresponding to peripheral media devices of the at least one peripheral media device connected to the main media device via one exclusive communication line, and the communication channel off signal corresponding to peripheral media devices of the at least one peripheral media device having no exclusive communication line connection to the main media device.

41. A multimedia system comprising:
at least one peripheral media device providing an input source for generating a multimedia input;
a main media device for receiving the multimedia input from said at least one peripheral media device; and
a memory for storing code conversion data corresponding to said main media device and said at least one peripheral media device,
wherein said main media device comprises:
at least one communication port connected via an exclusive communication line to said at least one peripheral media device;
input means for inputting a control code to said main media device, the control code including one of a first code for controlling said main media device, a second code for controlling said at least one peripheral media device, and an input source selection signal for controlling an application of the first and second codes, the input control code controlling the input source to said main media device;
a controller for, in response to the input control code, verifying a connection of said at least one peripheral media device to the at least one communication port, to generate a code conversion control signal and an output control signal; and
a code converter for converting, based on the code conversion control signal, the second code into a converted control code using the stored code conversion data in form fit for the verified peripheral media device if said at least one peripheral media device corresponding to the present external input mode is connected to said at least one communication port and for outputting the converted control code to the at least one communication port to control the verified peripheral media device;
wherein the output control signal controls the at least one communication port of said main media device to output the converted control code from the code converter to said at least one peripheral media device according to the verified connection.

42. The multimedia system of claim 41, wherein the input means comprises a remote controller for generating remote codes and a remote code receiver and processor for receiving and processing the generated remote codes.

43. The multimedia system of claim 41, wherein said memory is provided to said main media device.

44. The multimedia system of claim 41, wherein the main media device includes a television receiver.

45. The multimedia system of claim 41, wherein the at least one peripheral media device includes at least one of a television receiver, a DVD player, a videocassette recorder, and a set-top box.

46. The multimedia system of claim 41, wherein the exclusive communication line is connected to the at least one peripheral media device at a communication port compatible with the at least one communication port of the main media device.

47. The multimedia system of claim 46, wherein the at least one communication port of the main media device is one of an RS-232 serial port, an I$^2$C bus port, and a parallel port.

48. The multimedia system of claim 41, wherein the input source generates at least one of an audio signal and a video signal and wherein the at least one of an audio signal and a video signal is output by the main media device according to the input control code.

49. The multimedia system of claim 41, further comprising:
output means for outputting the multimedia input of the main media device.

50. The multimedia system of claim 49, wherein said output means is provided to said main media device.

51. The multimedia system of claim 49, further comprising:
means for generating on-screen data corresponding to an indication of the establishment of a communication channel corresponding to the verified connection.

52. The multimedia system of claim 49, further comprising:
means for generating on-screen data corresponding to the input source selection signal.

53. A media device for receiving a multimedia input from at least one peripheral media device, the media device comprising:
at least one communication port for connection via a exclusive communication line to the at least one peripheral media device;
a memory for storing code conversion data corresponding to the main media device and the at least one peripheral media device,
input means for inputting a control code to the main media device, the control code including one of a first code for controlling the main media device, a second code for controlling the at least one peripheral media device, and an input source selection signal for controlling an application of the first and second codes, the input control code controlling the input source to the main media device;
a controller for, in response to the input control code, verifying a connection of the at least one peripheral media device to said at least one communication port, to generate a code conversion control signal and an output control signal; and
a code converter for converting, based on the code conversion control signal, the second code into a converted control code in a form fit for said at least one verified peripheral media device if the peripheral media device corresponding to the present external input mode is connected to said at least one communication port using the stored code conversion data and for outputting the converted control code to said at least one communication port,
wherein the output control signal controls said at least one communication port of the main media device to output the converted control code from said code converter to the at least one peripheral media device according to the verified connection.

54. The media device of claim 53, further comprising a remote controller for generating remote codes for transmission to said input means.

55. The media device of claim 53, wherein the multimedia input is input to a television receiver.

56. The media device of claim 55, wherein the television receiver includes a display for displaying the multimedia input.

57. The media device of claim 56, wherein the displayed multimedia input includes at least one of on-screen data corresponding to an indication of the establishment of a communication channel corresponding to the verified connection, on-screen data corresponding to the input source selection signal, an audio signal, and a video signal.

* * * * *